US011284229B2

(12) United States Patent
Matsunaga et al.

(10) Patent No.: US 11,284,229 B2
(45) Date of Patent: Mar. 22, 2022

(54) SENSING SYSTEM AND TIME STAMP CORRECTION METHOD

(71) Applicant: NIPPON TELEGRAPH AND TELEPHONE CORPORATION, Tokyo (JP)

(72) Inventors: Kenichi Matsunaga, Tokyo (JP); Shoichi Oshima, Tokyo (JP); Ahmed Musa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 242 days.

(21) Appl. No.: 16/486,103

(22) PCT Filed: Feb. 15, 2018

(86) PCT No.: PCT/JP2018/005224
§ 371 (c)(1),
(2) Date: Aug. 14, 2019

(87) PCT Pub. No.: WO2018/151202
PCT Pub. Date: Aug. 23, 2018

(65) Prior Publication Data
US 2020/0236517 A1    Jul. 23, 2020

(30) Foreign Application Priority Data

Feb. 17, 2017  (JP) .............................. JP2017-027820

(51) Int. Cl.
*H04W 4/38*  (2018.01)
*H04L 7/00*  (2006.01)
*H04L 67/12*  (2022.01)

(52) U.S. Cl.
CPC ............. *H04W 4/38* (2018.02); *H04L 7/0008* (2013.01); *H04L 67/12* (2013.01)

(58) Field of Classification Search
CPC ...... H04W 4/38; H04W 56/00; H04L 7/0008; H04L 67/12; H04J 3/0664; G08C 17/02
See application file for complete search history.

(56) References Cited

U.S. PATENT DOCUMENTS 6,563,796 B1 *  5/2003  Saito ................... H04L 12/5601
370/252
11,038,609 B2 *  6/2021  Matsunaga ........... H04J 3/0664
(Continued)

FOREIGN PATENT DOCUMENTS

JP    2006013969 A  *  1/2006
JP    2009-152899 A     7/2009
(Continued)

OTHER PUBLICATIONS

Zarros et al., "Statistical Synchronization Among Participants in Real-Time Multimedia Conference", 1994, IEEE, The City University of New York, City College (Year: 1994).*
(Continued)

*Primary Examiner* — Justin T Van Roie
(74) *Attorney, Agent, or Firm* — Womble Bond Dickinson (US) LLP

(57) ABSTRACT

A sensor control circuit periodically transmits packets in synchronism with a one-by-one monotonous change in count values from a real-time clock circuit. The count values repeat the change within a predetermined numerical value range. The sensor control circuit transmits the count values by adding them to the packets. A collection control circuit acquires values of a reference clock synchronized with a reference time of an upper network from a reference clock generation circuit in accordance with reception of the packets, stores the values in a storage circuit as time stamps representing arrival times of the packets, performs statistical processing of the time stamps and the count values concerning the packets received, and corrects the time stamps based
(Continued)

on an packet transmission interval and a reference arrival time representing the arrival time of a head packet, which are obtained from the statistical processing.

5 Claims, 8 Drawing Sheets

(56) References Cited

U.S. PATENT DOCUMENTS

| | | | | |
|---|---|---|---|---|
| 2007/0140398 | A1* | 6/2007 | Inoue | H04N 21/4344 375/372 |
| 2010/0103878 | A1 | 4/2010 | Fujiwara et al. | |
| 2012/0188997 | A1* | 7/2012 | Zakrzewski | H04J 3/0667 370/350 |
| 2013/0297563 | A1* | 11/2013 | Kim | G06Q 10/10 707/618 |
| 2015/0127284 | A1* | 5/2015 | Seshan | G01D 21/00 702/89 |
| 2017/0041357 | A1* | 2/2017 | Wang | H04L 65/4015 |
| 2018/0084299 | A1* | 3/2018 | Ooishi | H04N 21/4344 |

FOREIGN PATENT DOCUMENTS

| | | |
|---|---|---|
| JP | 2010-102549 A | 5/2010 |
| JP | 2015-114290 A | 6/2015 |
| WO | 2015/087751 A1 | 6/2015 |

OTHER PUBLICATIONS

International Preliminary Report on Patentability received for PCT Patent Application No. PCT/JP2018/005224, dated Aug. 29, 2019, 10 pages (6 pages of English Translation and 4 pages of Original Document).

International Search Report and Written Opinion received for PCT Patent Application No. PCT/JP2018/005224, dated May 22, 2018, 10 pages (5 pages of English Translation and 5 pages of Original Document).

Suzuki, Makoto, "Survey Trend of Time synchronization Techniques in Wireless Sensor Networks", Research Center for Advanced Science and Technology, The University of Tokyo, Morikawa Laboratory, Technical Research Report, No. 2008001, Apr. 24, 2008, 18 pages (10 pages of English Translation and 8 pages of Original Document).

* cited by examiner

FIG.10

| NAME | ASSUMED ENVIRONMENT | PRINCIPLE | ACCURACY | WEAK POINT |
|---|---|---|---|---|
| NTP | REMOTE/WIRED/BIDIRECTIONAL COMMUNICATION | TIME STAMP EXCHANGE | △ | IP SUPPORT IS ESSENTIAL → OVERHEAD IS LARGE |
| RBS | VICINITY/INTER-SLAVE COMMUNICATION | TIME STAMP OF SYNCHRONIZATION PACKET | △ | NUMBER OF SLAVE UNITS INCREASES → COMMUNICATION AMOUNT INCREASES |
| FPST | VICINITY/ONE-WAY COMMUNICATION | TIME STAMP IN WIRELESS MAC LAYER | ○ | OPERATION OF MAC LAYER IS ESSENTIAL → WiFi AND BT ARE UNUSABLE |
| TPSN | VICINITY/TREE-TYPE/BIDIRECTIONAL COMMUNICATION | TIME STAMP EXCHANGE | ○ | CUSTOMIZATION OF BACK END IS NECESSARY |
| GPS | OUTDOOR/ONE-WAY COMMUNICATION | TIME STAMP OF GPS | ◎ | INDOOR USE IS IMPOSSIBLE, AND POWER CONSUMPTION IS LARGE |

SENSING SYSTEM AND TIME STAMP CORRECTION METHOD

TECHNICAL FIELD

The present invention relates to a time stamp correction technique for correcting a time stamp concerning sensor data wirelessly transmitted from a sensor terminal and received by a data collection terminal.

BACKGROUND ART

In an IoT (Internet of Things) society in which all things are connected to the Internet, it is expected that various kinds of sensors are connected to networks, a large amount of various kinds of data are collected, and information useful for humans is extracted by analyzing the data. FIG. 8 shows an example of the arrangement of a sensor network used in the IoT. Under such circumstances, terminals that store sensors are required to cope with various use cases and needs, and a problem may arise in operation only with smartphones as the current mainstream.

In particular, it is difficult to connect a number of smartphones simultaneously. As a measure against this, the network of sensor storing terminals is configured as a tree type so that the number of smartphones to be connected can be expected to increase. FIG. 9 shows an example of the arrangement of a general sensor network. In particular, BLE (Bluetooth Low Energy) formed by extending Bluetooth® that is one of short distance wireless communication techniques enables communication with very low power, and is therefore very useful as a wireless communication method between a sensor and a sensor storing terminal.

However, when this method is employed, time stamps are often added by a data collection terminal (slave). If there is a time shift between a slave and a master, a reference time concerning sensing is unclear. Hence, various time synchronization methods have been proposed conventionally. FIG. 10 shows the study trends of conventional time synchronization techniques (see non-patent literature 1 and the like).

In this conventional technique, however, when adding a time stamp by a data collection terminal, a delay time concerning communication between a sensor and the data collection terminal cannot be canceled, and an error is always generated in the time stamp. On the other hand, there also exist cases in which a sensor is provided with a simple time stamp mechanism using an incremental counter that is incremented at a predetermined period. In many cases, an oscillator of low accuracy is used to reduce the cost of the sensor device, and an error occurs.

That is, when a time stamp is added by the simple time stamp mechanism provided in the sensor, monotony is guaranteed by the incremental counter. For this reason, even when a packet loss occurs in which data does not arrive at the data collection terminal, this can be recognized by referring to the incremental counter. On the other hand, the accuracy is low, and an error of several seconds occurs in one day. In particular, in a wearable device configured to perform measurement on a daily basis, the results do not match.

To the contrary, the accuracy of the time stamp of the data collection terminal is very high because, according to the synchronization method described in non-patent literature 1, synchronization can be applied to the upper network at a level to 1 ms or less. However, if a packet loss occurs, it can be estimated only from time. If a transmission delay occurs, the delay causes an error in the time stamp.

RELATED ART LITERATURE

Non-Patent Literature

Non-Patent Literature 1: Makoto Suzuki, "Research Trends of Time Synchronization Technologies in Wireless Sensor Networks", The University of Tokyo, Research Center for Advanced Science and Technology, Morikawa Laboratory, Technical Research Report, No. 2008001, Apr. 24, 2008.

DISCLOSURE OF INVENTION

Problem to be Solved by the Invention

The present invention has been made to solve the above-described problems, and has as its object to provide a time stamp correction technique of allowing a data collection terminal to obtain a time stamp with little error concerning sensor data without imparting a sophisticated clock function to a sensor terminal.

Means of Solution to the Problem

In order to achieve the above object, according to the present invention, there is provided a sensing system including a sensor terminal that stores measured sensor data in a packet and wirelessly transmits the packet, and a data collection terminal that collects the sensor data by receiving the packet and transfers the sensor data to an upper network, wherein the sensor terminal comprises a real-time clock circuit that counts, by a counter, a sensor clock generated by the sensor terminal itself, and thereby outputs a count value that repeats a monotonous change within a predetermined numerical value range, and a sensor control circuit that periodically transmits the packet in synchronism with the change in the count value, and transmits the count value by adding the count value to the packet, the data collection terminal comprises a reference clock generation circuit that generates a reference clock synchronized with a reference time acquired from the upper network, and a collection control circuit that acquires a value of the reference clock from the reference clock generation circuit in accordance with reception of the packet, and stores the value in a storage circuit as a time stamp representing an arrival time of the packet, and the collection control circuit performs statistical processing of the time stamps concerning a plurality of packets received and count values added to the plurality of packets, and recalculates the time stamps concerning the packets based on an obtained packet transmission interval and a reference arrival time representing an arrival time of a head packet.

According to the present invention, there is also provided a time stamp correction method used in a sensing system including a sensor terminal that stores measured sensor data in a packet and periodically wirelessly transmits the packet, and a data collection terminal that receives the packet, collects the sensor data, and transfers the sensor data to an upper network, comprising the steps of, by a real-time clock circuit of the sensor terminal, counting, by an incremental counter, a sensor clock generated by the sensor terminal itself, thereby outputting a count value that repeats a monotonous increment within a predetermined numerical value range, by a sensor control circuit of the sensor terminal, transmitting the packet in synchronism with the change in the count value, and adding the count value to the packet and transmitting the packet, by a reference clock generation circuit of the data collection terminal, generating a reference clock synchronized with a reference time acquired from the upper network, by a collection control circuit of the data collection terminal, acquiring a value of the reference clock from the reference clock generation circuit in accordance with reception of the packet and storing the value in a storage circuit as a time stamp representing an arrival time of the packet, and by the collection control circuit, performing statistical processing of the time stamps concerning a plurality of packets received and count values added to the plurality of packets, and recalculating the time stamps concerning the packets based on an obtained packet transmission interval and a reference arrival time representing an arrival time of a head packet.

Effect of the Invention

According to the present invention, errors included in the estimated values of the packet transmission interval and the initial arrival time are averaged. For this reason, when a time stamp is estimated based on these, an error included in the time stamp added at the time of reception can be reduced. Hence, the data collection terminal can obtain a time stamp with little error concerning sensor data without imparting a high-performance clock function capable of counting time information or calendar information to the sensor terminal. For this reason, the circuit arrangement of the sensor terminal can largely be simplified, and the cost of the entire sensing system can be reduced. In addition, the power consumption of the sensor terminal can be reduced, and the battery life can greatly be prolonged.

BRIEF DESCRIPTION OF DRAWINGS

FIG. 10 is a view showing the study trends of conventional time synchronization techniques.

BEST MODE FOR CARRYING OUT THE INVENTION

Embodiments of the present invention will now be described with reference to the accompanying drawings.

First Embodiment

A sensing system 1 according to the first embodiment of the present invention will be described first with reference to FIG. 1.

Figure 1:
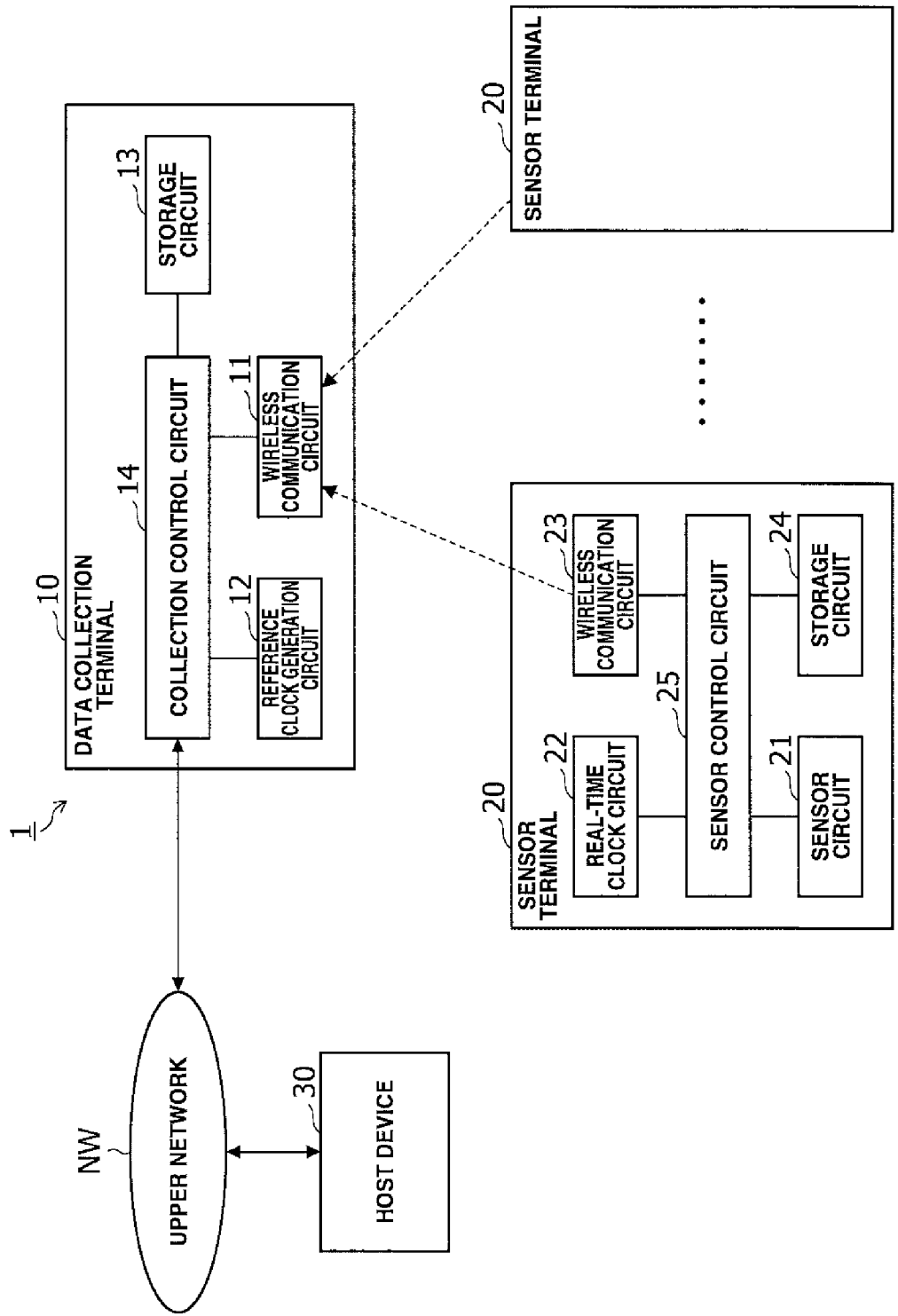
FIG. 1 is a block diagram showing the arrangement of a sensing system.

As shown in FIG. 1, the sensing system 1 is formed by a plurality of sensor terminals 20 configured to store, in packets, sensor data obtained by measuring various kinds of physical amounts by sensors and wirelessly transmit the packets, and a data collection terminal 10 configured to receive the packets from the sensor terminals 20, collect the sensor data, and transfer the sensor data to a host device 30 of an upper network NW.

[Sensor Terminal]

The sensor terminal 20 includes, as main components, a sensor circuit 21, a real-time clock circuit 22, a wireless communication circuit 23, a storage circuit 24, and a sensor control circuit 25.

The sensor circuit 21 is a sensor that measures various kinds of physical amounts. For example, in a sensing system that collects biological information of a human, sensors configured to measure physical states or operations, for example, body temperature, blood pressure, pulse, and acceleration sensors are used. However, the sensors are not limited to these, as a matter of course.

The real-time clock circuit 22 is a circuit portion that counts, by a counter, sensor clocks generated in the sensor terminal 20, and outputs an obtained count value. Since the counter counts the input sensor clocks one by one, the obtained count value repeats a monotonous change within a predetermined numerical value range corresponding to the bit width of the counter. In this embodiment, a case in which the counter is formed by an incremental counter, and the count value is monotonously incremented one by one will be described as an example. A decremental counter may be used. In this case, the count value is monotonously decremented one by one.

The wireless communication circuit 23 is a circuit portion that performs wireless communication with the data collection terminal 10.

The storage circuit 24 is a semiconductor memory that stores various kinds of processing data used for measurement and transmission of sensor data.

The sensor control circuit 25 is formed by an arithmetic processing unit formed by making a microprocessor such as a CPU/MPU and a program cooperate with each other, and has a function of storing, in a packet, sensor data representing a measurement result from the sensor circuit 21 and periodically transmitting the packet from the wireless communication circuit 23 to the data collection terminal 10 in synchronism with a change in the count value output from the real-time clock circuit 22, that is, in synchronism with one increment, and a function of, when transmitting the packet, adding the count value acquired from the real-time clock circuit 22 to the packet and transmitting the packet.

[Data Collection Terminal]

The data collection terminal 10 includes, as main components, a wireless communication circuit 11, a reference clock generation circuit 12, a storage circuit 13, and a collection control circuit 14.

The wireless communication circuit 11 is a circuit portion that that performs wireless communication with the sensor terminal 20.

The reference clock generation circuit 12 is a circuit portion that outputs a reference clock based on, for example, time information acquired from a time server on the upper network NW.

The storage circuit 13 is a semiconductor memory that stores a time stamp representing the arrival time of a packet that the wireless communication circuit 11 has received from the sensor terminal 20.

The collection control circuit 14 is formed by an arithmetic processing unit formed by making a microprocessor such as a CPU/MPU and a program cooperate with each other, and has a function of acquiring a reference clock from the reference clock generation circuit 12 every time the wireless communication circuit 11 receives a packet from the sensor terminal 20 and storing the reference clock in the storage circuit 13 as a time stamp representing the arrival time of the packet received, and a function of performing statistical processing of count values added to a plurality of packets received and the time stamps of these packets read out from the storage circuit 13 to estimate an initial arrival time representing the arrival time of a head packet that is the first of these packets received and a packet transmission interval representing the transmission interval of these packets.

In addition, the collection control circuit 14 has a function of recalculating the time stamps concerning the packets based on the estimated values of the initial arrival time and the packet transmission interval to correct the time stamp added at the time of packet reception, and a function of transferring the set of the sensor data and the time stamps to the host device 30. The time stamp generally includes not only time information but also calendar information because the time stamp is based on the reference time of the upper network NW, for example, the UNIX time. This allows the host device 30 to acquire time information and calendar information concerning sensor data even if the sensor terminal 20 does not have a clock function of counting overall time information or calendar information and includes only a counter of a simple arrangement.

Note that the collection control circuit 14 of the data collection terminal 10 preferably includes a microprocessor with a high calculation capability because it needs to perform statistical processing of heavy processing load. In addition, the reference clock generation circuit 12 need only implement a known time synchronization method such as a time synchronization method described in, for example, non-patent literature 1 to establish synchronization with the reference time of the upper network NW.

On the other hand, for the sensor control circuit 25 of the sensor terminal 20, a microprocessor of high performance need not be selected because the sensor control circuit 25 only adds the count value of the incremental counter to the packet of acquired sensor data. The lower the operating frequency is, the smaller the power consumption is. For this reason, a microprocessor with an operating frequency of, for example, 50 MHz or less may be used.

Operation of First Embodiment

The operation of the sensing system 1 according to this embodiment will be described next with reference to FIG. 2.

Figure 2:
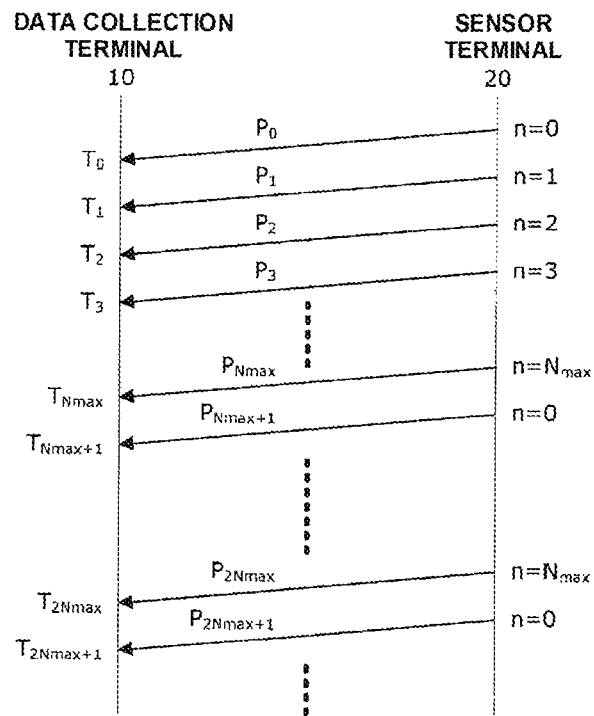
FIG. 2 is an explanatory view showing packet transmission.

As shown in FIG. 2, the sensor control circuit 25 of the sensor terminal 20 stores sensor data measured by the sensor circuit 21 in a packet, and periodically transmits the packet from the wireless communication circuit 11 to the data collection terminal 10 at a predetermined transmission interval in synchronism with a change in a count value n of the incremental counter from the real-time clock circuit 22. At this time, the sensor control circuit 25 acquires the count value n from the real-time clock circuit 22, adds the count value n to a packet P, and transmits the packet P.

In the example shown in FIG. 2, the transmission interval of the packet and the count operation of the incremental counter are in synchronism. The count value n is monotonously incremented one by one for each transmitted packet.

For this reason, a head packet $P_0$ transmitted first has the count value n=0. The count value n is incremented one by one for subsequent packets $P_1$, $P_2$ .... The count value n has a maximum value $N_{max}$ according to the bit width of the incremental counter. After reaching the maximum value $N_{max}$, the count value n is reset to zero and then monotonously incremented again.

On the other hand, every time the wireless communication circuit 11 receives the packet from the sensor terminal 20, the collection control circuit 14 of the data collection terminal 10 acquires a reference clock from the reference clock generation circuit 12 and stores it in the storage circuit 13 as a time stamp T representing the arrival time of the received packet.

The reference clock generation circuit 12 generates the reference clock synchronized with the precise time of the upper network NW based on the time information that the collection control circuit 14 periodically acquires from an apparatus such as a time server on the upper network NW. Accordingly, the time stamp representing the precise arrival time of each packet is stored in the storage circuit 13.

Figure 3A:
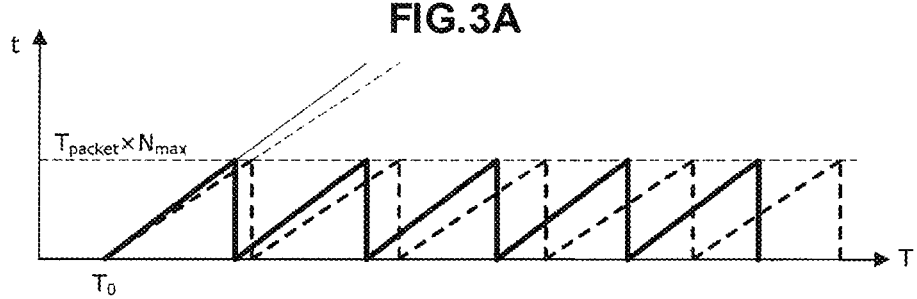
FIGS. 3A and 3B are graphs each showing the relationship between a time stamp and a measurement estimated time.
Figure 3B:
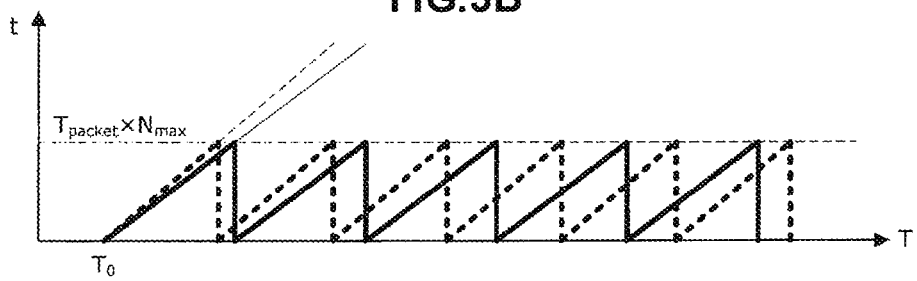

As shown in FIGS. 3A and 3B that are graphs each showing the relationship between the time stamp and the measurement estimated time, in a case in which a count value i added to a packet is incremented one by one for each packet, letting $T_0$ be the initial arrival time that is the arrival time of the head packet $P_0$ in the data collection terminal 10, and $T_{packet}$ be the transmission interval of the packet P, a time stamp t concerning a certain packet Pi whose count value is i is obtained by $$t = T_0 + T_{packet} \times i \quad (1)$$

However, if the sensor clock of the sensor terminal 20 is later than the reference, the transmission interval $T_{packet}$ becomes long, and therefore, the measurement estimated time t exhibits a characteristic (broken line) [[32]] extended to the rear side with respect to an initial characteristic (solid line) [[31]], as shown in FIG. 3A. On the other hand, if the sensor clock of the sensor terminal 20 is earlier than the reference, the transmission interval $T_{packet}$ becomes short, and therefore, the measurement estimated time t exhibits a characteristic (broken line) [[34]] contracted to the front side with respect to an initial characteristic (solid line) [[33]], as shown in FIG. 3B. In addition, since a transmission delay from the sensor terminal 20 to the data collection terminal 10 exists, the initial arrival time $T_0$ may have an error.

In the present invention, statistical processing of time stamps and count values concerning a plurality of packets is performed, thereby reducing the error included in the time stamp of each sensor data. Assume that $N_{max}$ packets P from the head packet $P_0$ to a packet $P_{Nmax-1}$ are received, and the time stamp of a packet $P_k$ (k is an integer from 0 to $N_{max-1}$) is represented by $T_k$. In this case, based on the least square method, the transmission interval $T_{packet}$ is estimated by equation (2), and the initial arrival time $T_0$ is estimated by equation (3).

$$T_{packet} = \frac{N_{max} \sum_{k=0}^{N_{max}-1} kT_k - \sum_{k=0}^{N_{max}-1} k \sum_{k=0}^{N_{max}-1} T_k}{N_{max} \sum_{k=0}^{N_{max}-1} k^2 - \left(\sum_{k=0}^{N_{max}-1} k\right)^2} \quad (2)$$

$$T_0 = \frac{\sum_{k=0}^{N_{max}-1} k^2 \sum_{k=0}^{N_{max}-1} T_k - \sum_{k=0}^{N_{max}-1} kT_k \sum_{k=0}^{N_{max}-1} k}{N_{max} \sum_{k=0}^{N_{max}-1} k^2 - \left(\sum_{k=0}^{N_{max}-1} k\right)^2} \quad (3)$$

Since the estimated values of the transmission interval $T_{packet}$ and the initial arrival time $T_0$ average errors caused by the transmission delay included in these, the processing priority in the microprocessor, and the like, the error included in the time stamp can be reduced. Hence, when the obtained estimated values of the transmission interval $T_{packet}$ and the initial arrival time $T_0$ are applied to equation (1) described above, the time stamp of each sensor data can accurately be estimated, that is, recalculated, and the time stamp added at the time of packet reception can be corrected. This is particularly useful in a sensing application that needs a relatively high sampling rate for an acceleration or a voltage waveform.

Figure 4:
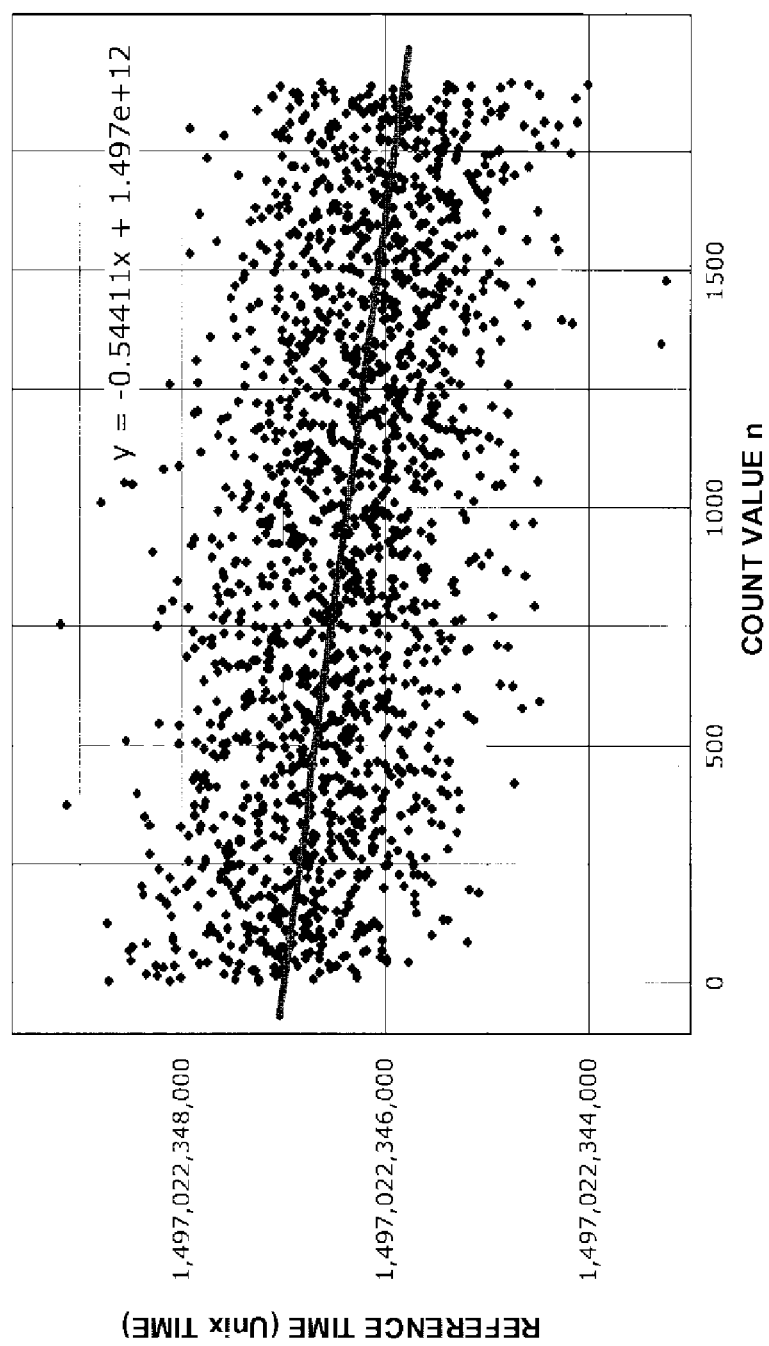
FIG. 4 is a graph showing a plot example of reference times for count values.

In a plot example of reference times for count values shown in FIG. 4, the UNIX® time is used as the reference time. Although the UNIX time is accurate, variations in the low latitudes of a normal distribution exist with respect to the trend. Hence, when the present invention is applied, the gradient can correctly be measured.

Figure 5:
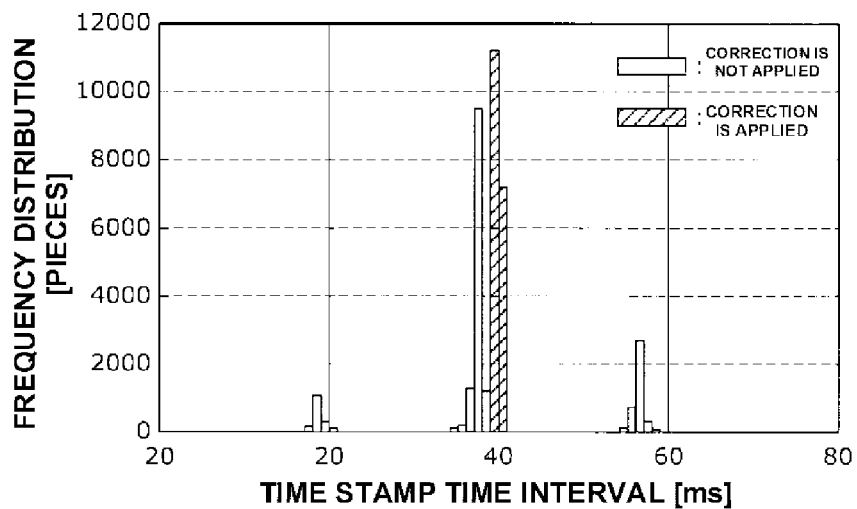
FIG. 5 is a graph showing the effect of time stamp correction according to this embodiment.

The graph of FIG. 5 shows a measurement result obtained by experimentarily measuring the frequency distribution of time stamp intervals of packets when the data collection terminal 10 receives packets parallelly transmitted from the plurality of sensor terminals 20 at a predetermined interval of 40 ms.

In a case of non-application in which time stamp correction is not applied, variations to 20 ms or 60 ms occur with respect to the actual interval of 40 ms as the center, as can be seen. Probable reasons are an error caused by a delay time concerning communication between the sensor terminal 20 and the data collection terminal 10, and a processing delay derived from a processing load needed for reception processing of the packets transmitted in parallel.

Figure 6:
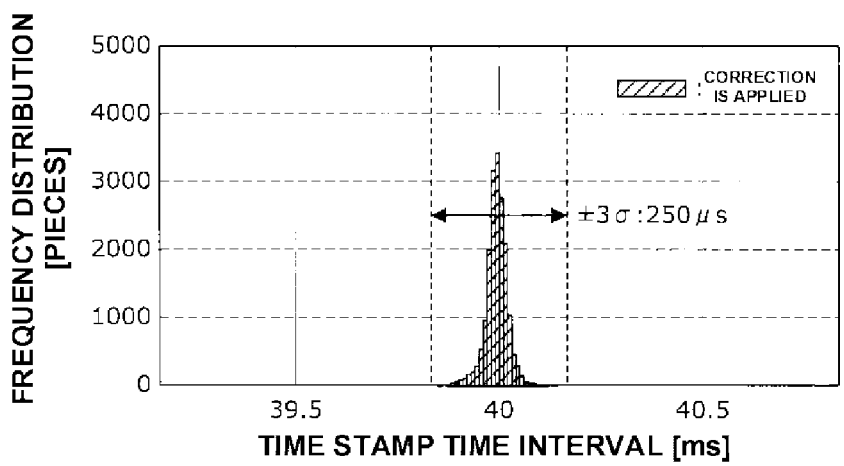
FIG. 6 is a graph showing an enlarged main portion of FIG. 5.

On the other hand, when the time stamp correction according to this embodiment is applied, as for the time stamp interval of packets received, the reliable section width of ±3a is 250 μs, as shown in FIG. 6. This means that the time stamp interval falls within the reliable section of 40 ms±125 μs at a probability of 99.7%, and shows a large effect by the time stamp correction according to this embodiment.

Effect of First Embodiment

As described above, in this embodiment, in the sensor terminal 20, the sensor control circuit 25 periodically transmits a packet in synchronism with a change in the count value from the real-time clock circuit 22, which is repetitively monotonously incremented within a predetermined numerical value range, and additionally acquires the count value, adds it to the packet, and transmits the packet. In the data collection terminal 10, in response to packet reception, the collection control circuit 14 acquires, from the reference clock generation circuit 12, the value of the reference clock synchronized with the reference time of the upper network NW, stores the value in the storage circuit 13 as a time stamp representing the arrival time of the packet, performs statistical processing of time stamps and count values concerning a plurality of packets received, and corrects the time stamps concerning the packets based on the obtained packet transmission interval and the reference arrival time representing the arrival time of the head packet.

Accordingly, the errors included in the estimated values of the transmission interval $T_{packet}$ and the initial arrival time $T_0$ are averaged. For this reason, when a time stamp is estimated based on these, an error included in the time stamp added at the time of packet reception can be reduced. Hence, the data collection terminal 10 can obtain a time stamp with little error concerning sensor data without imparting a high-performance clock function capable of counting time information or calendar information to the sensor terminal 20.

For this reason, the circuit arrangement of the sensor terminal 20 can largely be simplified, and the cost of the entire sensing system 1 can be reduced. In addition, the power consumption of the sensor terminal 20 can be reduced, and the battery life can greatly be prolonged.

Furthermore, the time stamp can be estimated based on the estimated values of the transmission interval $T_{packet}$ and the initial arrival time $T_0$. Hence, even if a packet loss occurs between the sensor terminal 20 and the data collection terminal 10, sensor data can be measured and corrected based on the correct reference time synchronized with the upper network NW.

Second Embodiment

A sensing system 1 according to the second embodiment of the present invention will be described next.

The method using the least square method using the value n from 0 to $N_{max}$, which has been described in the first embodiment, has a very high accuracy. However, if $N_{max}$ is a large value, the time stamps of packets are not determined until all the data are obtained. This is particularly problematic in an application that requires real-time property. In addition, since a large memory area corresponding to $N_{max}$ is necessary in a data collection terminal 10, the cost for that is also problematic.

In this embodiment, a collection control circuit 14 of the data collection terminal 10 performs statistical processing using a number smaller than the maximum value of the count value as a constraint length concerning the number of packets used for statistical processing, thereby estimating a transmission interval $T_{packet}$ and an initial arrival time $T_0$. The rest of the arrangement of the sensing system 1 according to this embodiment is the same as in the first embodiment, and a description thereof will be omitted here.

As described above, when calculation is performed using a unique constraint length $N'_{max}$ that satisfies $1 < N'_{max} < N_{max}$, it is possible to improve the real-time property, decrease the capacity of the time stamp accumulation memory in the data collection terminal 10, and reduce the cost.

As for how to select the value $N'_{max}$, letting M be an arbitrary integer, a value with which $N'_{max}+1=N_{max}/M$ is an integer is preferably selected. This is a contrivance to prevent the influence of a change in the value, which is caused when n returns from $N_{max}$ to 0. Since $N'_{max+1}$ is generally a multiplier of 2 because of the characteristic of the MPU, a multiplier of 2 can be selected as M almost without any problem.

Third Embodiment

A sensing system 1 according to the third embodiment of the present invention will be described next.

In the above-described second embodiment, since estimation does not end unless data corresponding to the constraint length $N'_{max}$ is wholly obtained, there is still the problem of real-time property.

In this embodiment, at the time of statistical processing, a collection control circuit 14 reads out time stamps concerning packets received within the constraint length before the latest packet last received as target time stamps from a storage circuit 13, and performs statistical processing of the time stamps. The rest of the arrangement of the sensing system 1 according to this embodiment is the same as in the first embodiment, and a description thereof will be omitted here.

At this time, more specifically, when the collection control circuit 14 stores a new time stamp in the storage circuit 13 in accordance with reception of a packet, if the number of already stored time stamps is less than the constraint length, the new time stamp is stored successively from the beginning of the storage area provided in the storage circuit 13. If the number of time stamps has reached the constraint length, the oldest time stamp located at the beginning of the storage area is erased, the rest of the time stamps are shifted so as to be successively arranged from the beginning of the storage area, and the new time stamp is stored at the end of the storage area.

In addition, at the time of statistical processing, all time stamps stored in the storage area are read out as target time stamps from the storage circuit 13, and statistical processing is performed.

Accordingly, the packets corresponding to the constraint length to be used for the statistical processing are used while being shifted (slid) one by one in each statistical processing. That is, a constraint length $N'_{max}$ used in the statistical processing is not changed. To estimate the parameter of an ith packet, ith, (i-1)th, (i-2)th, . . . , (i-$N'_{max}$+1)th packets are used.

In this case, a transmission interval $T_{packet}$ is estimated by equation (4), and an initial arrival time $T_0$ is estimated by equation (5).

$$T_{packet}(i) = \frac{N'_{max} \sum_{k=i-N'_{max}+1}^{i} kT_k - \sum_{k=i-N'_{max}+1}^{i} k \sum_{k=i-N'_{max}+1}^{i} T_k}{N'_{max} \sum_{k=i-N'_{max}+1}^{i} k^2 - \left(\sum_{k=i-N'_{max}+1}^{i} k\right)^2} \quad (4)$$

$$T_0(i) = \frac{\sum_{k=i-N'_{max}+1}^{i} k^2 \sum_{k=i-N'_{max}+1}^{i} T_k - \sum_{k=i-N'_{max}+1}^{i} kT_k \sum_{k=i-N'_{max}+1}^{i} k}{N'_{max} \sum_{k=i-N'_{max}+1}^{i} k^2 - \left(\sum_{k=i-N'_{max}+1}^{i} k\right)^2} \quad (5)$$

In this method, however, since an error occurs when n changes from $N_{max}$ to 0, this needs to be corrected. As the correction method, if $T_{j+1} - T_j < -T_{th}$ holds for an integer satisfying $0 < j < i - N'_{max}$, calculation is performed by adding $T_{packet} * N_{max}$ to each of $T_{j+1}, T_j, \ldots , T_{i-N'max+1}$. The threshold $T_{th}$ can be selected by an arbitrary method. When the threshold is set to almost $N_{max}/2$ to prevent a time fluctuation or temporary packet loss caused by an error in the processing time or transmission time, a satisfactory operation can be performed.

Figure 7:
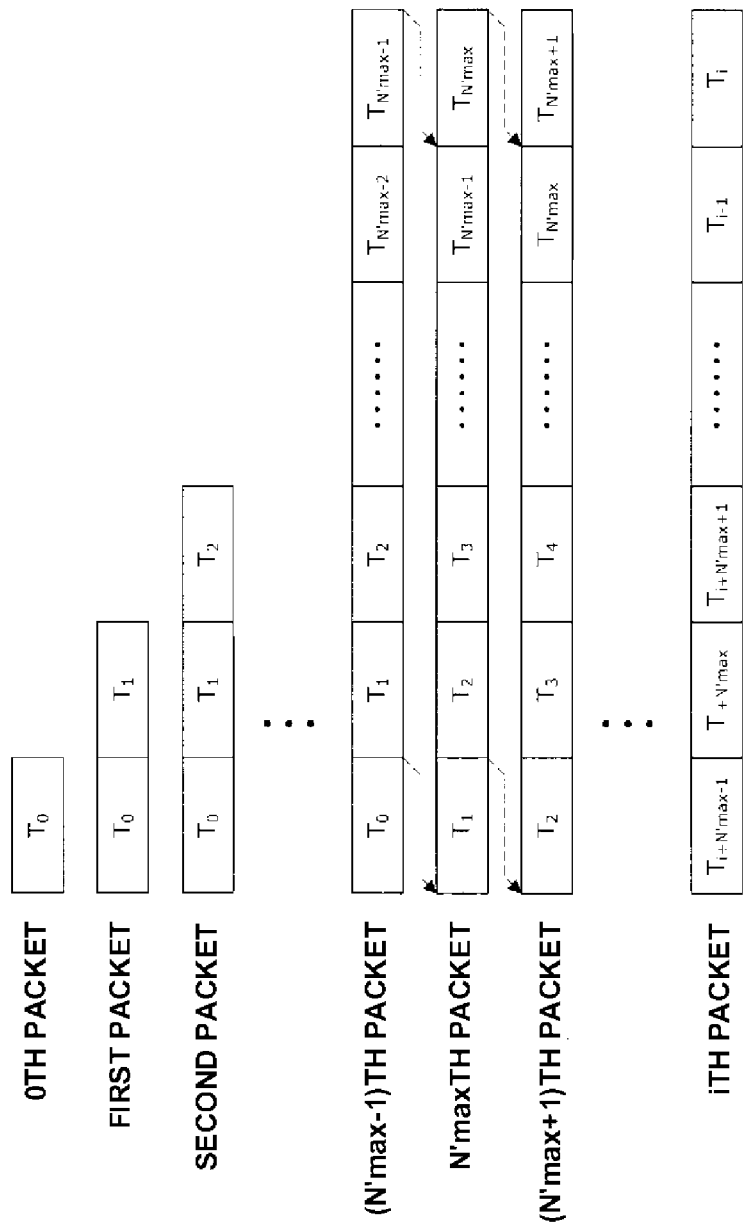
FIG. 7 is a view showing a storage example of time stamps.
Figure 8:
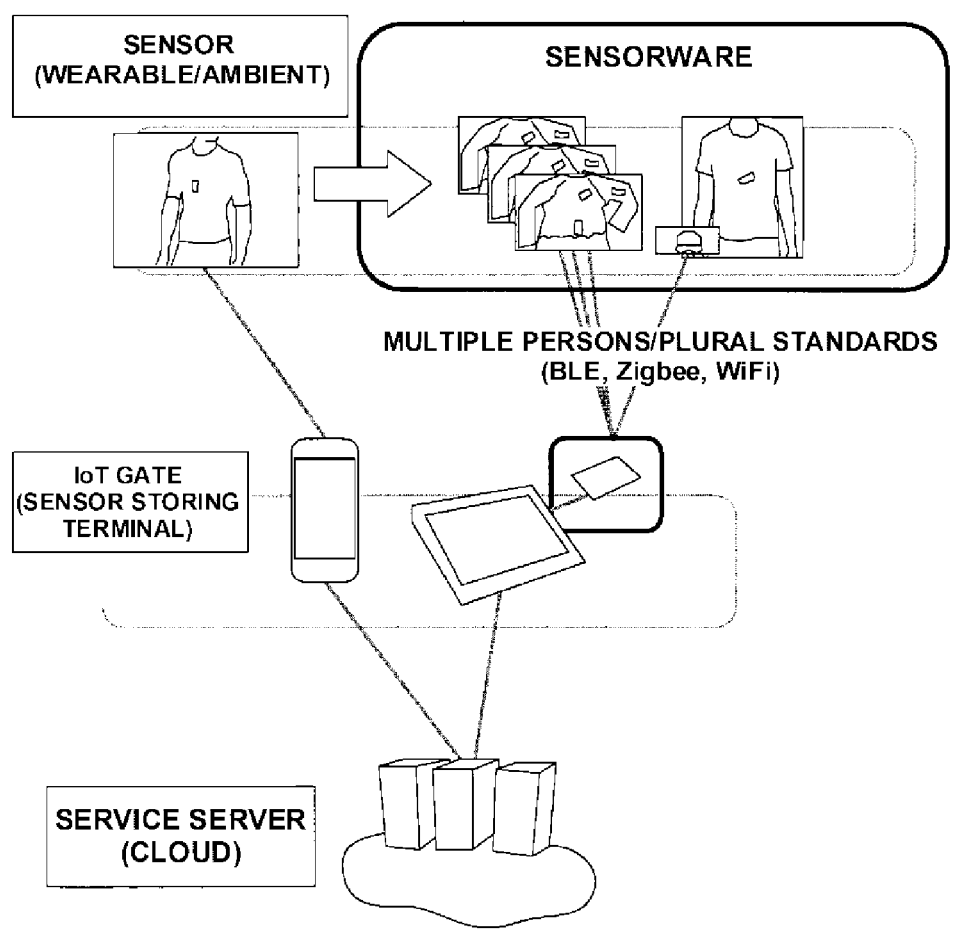
FIG. 8 is a view showing an example of the arrangement of a sensor network used in an IoT.
Figure 9:
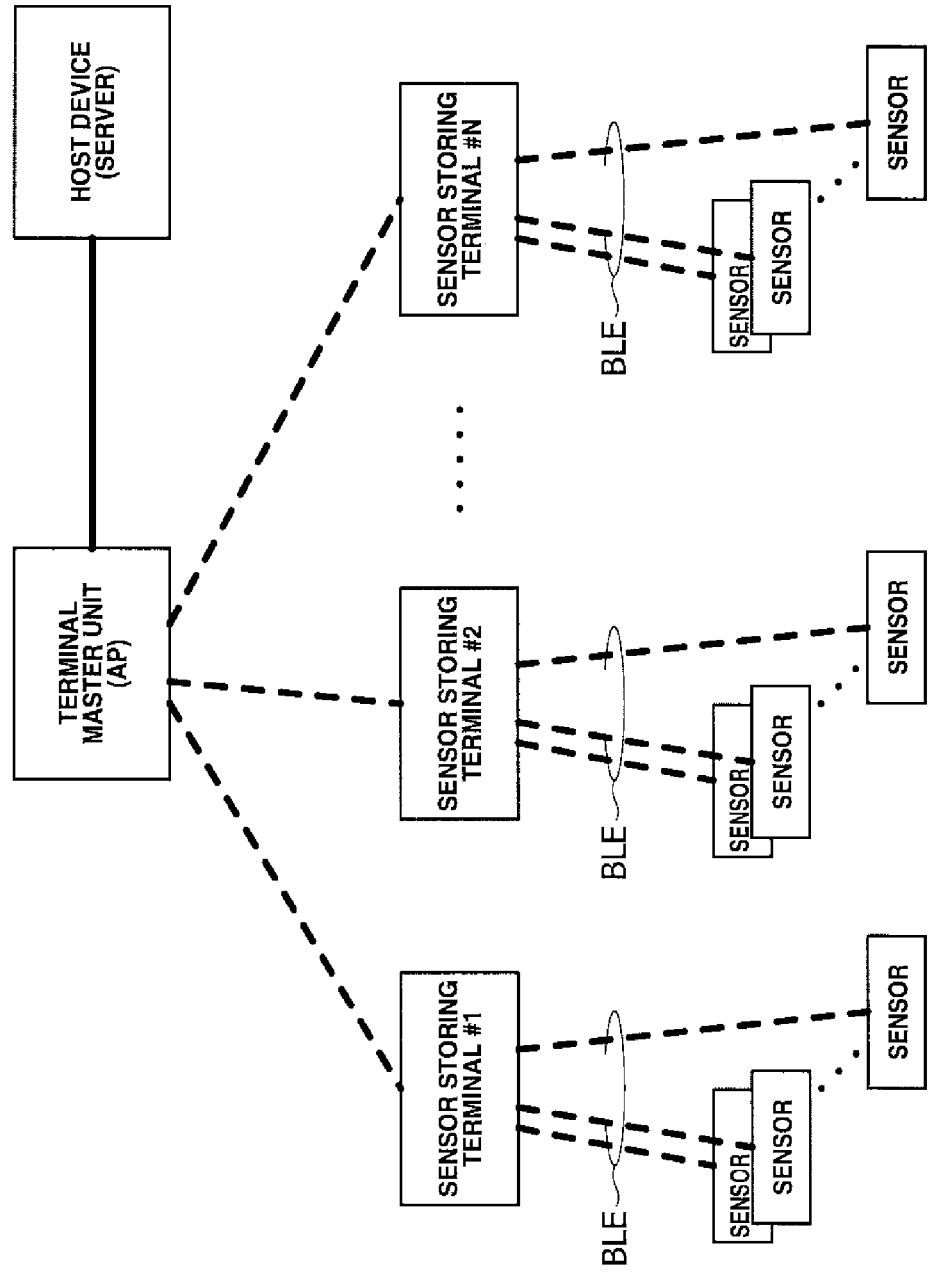
FIG. 9 is a view showing an example of the arrangement of a general sensor network.

To the contrary, a time difference more than this means disconnection. FIG. 7 shows a storage example of time stamps. Until the number of packets reaches $N'_{max}$, the storage areas in the storage circuit 13 concerning time stamps are increased one by one to store new time stamps. After the number of packets reaches $N'_{max}$, old time stamps are erased one by one successively in chronological order, the remaining time stamps are shifted, and a new time stamp is stored at the end.

According to this method, at the beginning of packet reception, the number of packets is small, and the accuracy of estimated time stamps is unstable. As the number of packets approaches $N'_{max}$, the effect of averaging processing by the least square method is gradually exerted, and the estimation accuracy improves. In addition, when the number of packets reaches $N'_{max}$, the statistical processing is performed immediately after a new packet is received. Hence, the latency is reduced, and the real-time property improves.

Extension of Embodiment

The present invention has been described above with reference to the exemplary embodiments. However, the present invention is not limited to the above exemplary embodiments. Various changes and modifications understandable by those who are skilled in the art can be done for the arrangements and details of the present invention without departing the scope of the present invention. In addition, the embodiments can be arbitrary combined and implemented without inconsistency.

EXPLANATION OF THE REFERENCE NUMERALS AND SIGNS

1 . . . sensing system, 10 . . . data collection terminal, 11 . . . wireless communication circuit, 12 . . . reference clock generation circuit, 13 . . . storage circuit, 14 . . . collection control circuit, 20 . . . sensor terminal, 21 . . . sensor circuit, 22 . . . real-time clock circuit, 23 . . . wireless communication circuit, 24 . . . storage circuit, 25 . . . sensor control circuit, 30 . . . host device, NW . . . upper network

The invention claimed is:

1. A sensing system including a sensor terminal that stores measured sensor data in packets and wirelessly transmits the packets, and a data collection terminal that collects the measured sensor data by receiving the packets and transfers the measured sensor data to an upper network, wherein the sensor terminal comprises:
a real-time clock circuit that counts, by a counter, a sensor clock generated by the sensor terminal itself, and thereby outputs count values that repeat a one-by-one monotonous change within a predetermined numerical value range; and
a sensor control circuit that periodically transmits the packets in synchronism with the one-by-one monotonous change in the count values, and transmits the count values by adding the count values to the packets, and the data collection terminal comprises:
a reference clock generation circuit that generates a reference clock synchronized with a reference time acquired from the upper network; and
a collection control circuit that acquires values of the reference clock from the reference clock generation circuit in accordance with reception of the packets; and stores the values in a storage circuit as time stamps representing arrival times of the packets, wherein the collection control circuit performs statistical processing of the time stamps concerning the packets received and the count values added to the packets to obtain estimated values of a packet transmission interval and an initial arrival time representing an arrival time of a head packet, and recalculates the time stamps concerning the packets by adding a product of the estimated value of the packet transmission interval and the count values to the estimated value of the initial arrival.

2. The sensing system according to claim 1, wherein the collection control circuit uses a number which is larger than 1 and smaller than a maximum value of the count values as a constraint length concerning a number of packets used in the statistical processing.

3. The sensing system according to claim 2, wherein when performing the statistical processing, the collection control circuit reads out the time stamps concerning the packets received within the constraint length before a latest packet last received as target time stamps from the storage circuit, and performs the statistical processing of the time stamps.

4. The sensing system according to claim 2, wherein, when storing a new time stamp in the storage circuit in accordance with reception of a new packet of the packets, if a number of time stamps already stored is less than the constraint length, the collection control circuit stores the new time stamp successively from a beginning of a storage area provided in the storage circuit, and if the number of time stamps has reached the constraint length, the collection control circuit erases an oldest time stamp of the time stamps located at the beginning of the storage area, shifts the rest of the time stamps so as to be arranged successively from the beginning of the storage area, and then stores the new time stamp at an end of the storage area, and when performing the statistical processing, the collection control circuit reads out all the time stamps stored in the storage area as target time stamps from the storage circuit, and performs the statistical processing of the time stamps.

5. A time stamp correction method used in a sensing system including a sensor terminal that stores measured sensor data in packets and periodically wirelessly transmits the packets, and a data collection terminal that receives the packets, collects the measured sensor data, and transfers the measured sensor data to an upper network, the time stamp correction method comprising the steps of:

by a real-time clock circuit of the sensor terminal, counting, by a counter, a sensor clock generated by the sensor terminal itself, thereby outputting count values that repeat a one-by-one monotonous change within a predetermined numerical value range;

by a sensor control circuit of the sensor terminal, transmitting the packets in synchronism with the one-by-one monotonous change in the count values, and transmitting the count values by adding the count values to the packets;

by a reference clock generation circuit of the data collection terminal, generating a reference clock synchronized with a reference time acquired from the upper network;

by a collection control circuit of the data collection terminal, acquiring values of the reference clock from the reference clock generation circuit in accordance with reception of the packets and storing the values in a storage circuit as time stamps representing arrival times of the packets; and by the collection control circuit, performing statistical processing of the time stamps concerning the packets received and the count values added to the packets to obtain estimated values of a packet transmission interval and an initial arrival time representing an arrival time of a head packet, and recalculating the time stamps concerning the packets by adding a product of the estimated value of the packet transmission interval and the count values to the estimated value of the initial arrival.

\* \* \* \* \*